United States Patent [19]

Hucul

[11] Patent Number: 4,713,363

[45] Date of Patent: Dec. 15, 1987

[54] HIGH SURFACE AREA SUPPORTED NOBLE METAL CATALYSTS AND PROCESS FOR THEIR PREPARATION

[75] Inventor: Dennis A. Hucul, Midland, Mich.

[73] Assignee: The Dow Chemical Company, Midland, Mich.

[21] Appl. No.: 918,597

[22] Filed: Oct. 10, 1986

Related U.S. Application Data

[63] Continuation-in-part of Ser. No. 686,878, Dec. 27, 1984, abandoned.

[51] Int. Cl.$^4$ .................. B01J 21/04; B01J 21/08; B01J 23/40
[52] U.S. Cl. ............................ 502/262; 502/332; 502/333; 502/334; 560/207
[58] Field of Search ............... 502/262, 332, 333, 334; 560/207

[56] References Cited

U.S. PATENT DOCUMENTS

| | | | |
|---|---|---|---|
| 2,623,860 | 12/1952 | Haensel | 252/441 |
| 2,739,946 | 3/1956 | Guyer et al. | 502/334 |
| 2,780,603 | 2/1957 | Burton | 252/466 |
| 2,802,794 | 8/1957 | Spraner | 252/466 |
| 2,834,740 | 5/1958 | Johnson et al. | 252/466 |
| 2,857,337 | 10/1958 | Hamilton et al. | 252/472 |
| 2,908,656 | 10/1959 | Hindin et al. | 252/466 |
| 2,989,488 | 6/1961 | Connor et al. | 252/455 |
| 3,637,529 | 1/1972 | Van Beck et al. | 252/459 |
| 3,939,059 | 2/1976 | Antos | 208/139 |
| 3,956,190 | 5/1976 | Sinfelt | 252/466 PT |
| 3,959,180 | 5/1976 | Bittner et al. | 252/455 Z |
| 4,049,576 | 9/1977 | Kovach et al. | 252/441 |
| 4,073,750 | 2/1978 | Yates et al. | 252/459 |
| 4,093,559 | 6/1978 | Fernholz et al. | 252/443 |
| 4,113,658 | 9/1978 | Geus | 252/454 |
| 4,384,133 | 5/1983 | Miyazaki et al. | 560/204 |
| 4,480,121 | 10/1984 | Klun et al. | 502/207 X |

OTHER PUBLICATIONS

Scholten et al., *Journal of Catalysis*, 1, pp. 85–92, (1962).
Aben, *Journal of Catalysis*, 10, pp. 224–229, (1968).
R. Van Hardeveld et al., *Surface Science*, 4, (1966), 396–430.
T. A. Dorling et al., *Journal of Catalysis*, 7, 378–385, (1967).
Dorling et al., *Journal of Catalysis*, 20, 190–201, (1971).
Zaidman et al., Institute of Catalysis, Siberian Division of the Academy of Sciences of the USSR, Novosibirsk. Translated from Kinetika i Kataliz, vol. 10, No. 2, pp. 386–391, Mar.–Apr., 1969, original article submitted Apr. 22, 1968.
Anderson, *Structure of Metallic Catalysts*, pp. 196–203, Academic Press, NY, (1975).
Yao, *Journal of Catalysis*, 50, 407–418, (1977).
Sarkany, *Applied Catalysis*, 4, 53–66, (1982).

Primary Examiner—W. J. Shine
Attorney, Agent, or Firm—Charles J. Enright

[57] ABSTRACT

Novel supported noble metal catalysts have high metal loadings and dispersions and are particularly effective catalysts in the conversion of 2-chloropropene to methyl methacrylate by vapor phase reaction with methanol and carbon monoxide.

21 Claims, No Drawings

HIGH SURFACE AREA SUPPORTED NOBLE METAL CATALYSTS AND PROCESS FOR THEIR PREPARATION

CROSS-REFERENCE TO RELATED APPLICATION

This is a continuation in part, of application Ser. No. 686,878 filed Dec. 27, 1984, now abandoned.

BACKGROUND OF THE INVENTION

The present invention relates to reduced noble metal catalysts. More particularly, the present invention relates to reduced noble metal catalysts on shaped metal oxide supports having high loadings and dispersions of the noble metal.

Supported metal catalysts may be conveniently described by reference to the total metal content thereof measured as percent of dry catalyst weight and to the dispersion of the metal on the catalyst surface. Metal dispersion is a measure of effective availability of metal and is inversely related to metal crystallite size. Larger crystallite sizes (smaller metal dispersion values) result in a loss of metal availability due to occlusion of metal atoms within the crystallites.

It has been previously known to prepare noble metal catalysts on shaped metal oxide supports such as extrudates. However, such catalysts either possess low metal loadings, e.g., less than about 0.45 millimoles of noble metal/gram catalyst, or if higher loadings were obtained, the metal dispersion was relatively low, e.g., less than about 50 percent. Catalysts having low metal dispersions are undesirable since for all practical purposes, noble metal that is unavailable for catalytic activity is wasted. At the same time, catalysts having high metal dispersions obtained only at low metal loadings are equally wasteful due to the additional bulk of the catalyst support. Not only are larger volume reactors required in order to accommodate the extra volume of inert support thereby adding to process costs, but additional pressure losses attributable to the increase in catalyst volume may render a process uneconomical due to the increased operating pressures required. It would be desirable to prepare a supported noble metal catalyst having high metal loadings and dispersions. In particular, it would be desirable to prepare a supported noble metal catalyst having metal loadings greater than 0.45 mmoles/g of dry catalyst and having a dispersion greater than 50 percent.

Values of metal dispersion may be easily calculated for any metal and substrate if an average crystallite size is known. For example, metal dispersion (in percent) for a palladium catalyst is defined as $1122/D$ where D is the mean crystallite size measured in angstroms. The above formula may be applied to palladium catalysts regardless of the type, shape or size of the catalyst support, or the manner of preparation of the catalyst. Similar formulas for determining metal dispersions for other noble metal catalysts are contained in Anderson, *Structure of Metallic Catalysts*, pp. 360-63, Academic Press, NY (1975).

Numerous techniques are known for the preparation of noble metal catalysts. Examples include acid solution impregnation, ion-exchange, base precipitation, etc. In J. R. Anderson, *Structure of Metallic Catalysts*, Academic Press (1975), p. 199, it was stated that on silica supports the best palladium dispersion was obtained by cation-exchange. Average particle diameters of 14 angstroms at a 2.2 weight percent palladium loading (0.2 mmole/g) were reported. The largest loading and dispersion on alumina reported by the reference were those obtained by P. C. Aben, *J. Cat.*, 10, 224-229 (1968). The author alleged preparing palladium on alumina having 5 percent (0.47 mmole/g) and 15 percent (1.42 mmole/g) metal loadings and about 51 percent and 35 percent dispersions, respectively. At page 228, Table 4, note C, the author provided a formula for converting experimental hydrogen chemisorption ratios to crystallite size (in angstroms). The formula provided was $D=100\times0.885/H/Pd$. A more accepted formula for calculating dispersion is $D=100\times H/Pd$. Generalizing this equation to other metals one obtains:

$$D=100\times(W/M);$$

wherein D equals percent dispersion and W/M is the atomic ratio of chemisorbed hydrogen to the noble metal. Techniques for measuring free metal surface areas are disclosed generally in Scholten, J. J. F., "Preparation of Catalyst II," from *Studies in Surface Science and Catalysis*, Vol. III; ed. B. Delmon, P. Grame, P. Jacobs, G. Poncelet; Elsevier, Inc., New York, New York, 1979 and Scholten, J. J. F., Surface Characterization of Supported and NonSupported Hydrogenation Catalysts, *Catal. Rev.—Sci. Eng.*, 27(1), 151-206 (1985), both of which are incorporated herein by reference. The corresponding values of H/Pd provided by the reference and the resulting calculated values of D and percent dispersion are:

| Sample | H/Pd | Particle Size (angstroms) | % Dispersion* |
| --- | --- | --- | --- |
| 5% w Pd/Al$_2$O$_3$ | 0.41 | 22 | 41 |
| 15% w Pd/Al$_2$O$_3$ | 0.28 | 32 | 28 |

*Calculated from the formula 100 × H/Pd

Using techniques of carbon monoxide absorption, J. J. F. Scholten et al. *Journal of Catalysis*, 1, 85-92 (1962) alleged that a commercial catalyst with 5.5 percent (0.52 mmole/g) palladium on $\gamma$-Al$_2$O$_3$ had measured values of mean crystallite size of from 13.7 angstroms to 15.3 angstroms, depending on the measuring process employed. These values would correspond to a metal dispersion of either 82 percent or 73 percent. However in Scholten, (1979), supra., doubt is cast on these results. At pages 696 and 697, Scholten states that the carbon monoxide method has the difficulty that the chemisorption stoichiometry is variable because the proportion of chemisorbed species in the linear and bridged forms can vary. The carbon monoxide adsorbed depends on pressure temperature and metal particle size.

It has been previously known to prepare supported metal catalysts employing powdered rhodium supports having large loadings and dispersions. For example, H. C. Yao et al. disclosed powdered alumina catalysts having 5.3 percent (0.51 mmole/g) metal and 57 percent dispersion in *J. Catal.*, 50, 407 (1977). Powdered catalyst supports are particularly ineffective in some commercial practice due to the large pressure drop associated with a reactor filled with a powdered catalyst.

In numerous commercial processes such as hydrogenation of unsaturated compounds, e.g., edible oils, and carbonylation reactions, large amounts of catalyst are employed in reactors of large volumes and bed length.

In such operations, powdered catalysts, e.g., noble metal deposited on powdered metal oxide substrates, compact and fail to provide sufficient pore volume to allow ready permeation of the gaseous or liquid reactants which must pass through the catalyst bed. The consequent large pressure drop across the catalyst bed results in extremely limited throughput and correspondingly excessively high working pressures. Accordingly, it is highly desirable to prepare a noble metal catalyst on an extruded or shaped metal oxide support having sufficient size and porosity to provide permeation of gaseous or even liquid reactants therethrough without the use of excessive pressure differentials.

Equally necessary for certain processes, e.g., carbonylation reactions, high conversions and catalytic effectiveness are desired in order that the process be economically operated. Production costs and market price are directly related to capital costs associated with the process. An extremely costly item involves the catalyst and the necessary reactors, and associated handling, loading, pumping and contacting equipment. As a particular illustrative example, it has been found that a vapor phase process for the preparation of methyl methacrylate by reaction of 2-chloropropene, methanol and carbon monoxide under conditions of elevated temperature and pressure is rendered economically viable only by the use of a noble metal catalyst having high metal loadings and high metal dispersions.

SUMMARY OF THE INVENTION

According to the present invention, there is now provided a catalyst comprising a noble metal on a shaped metal oxide substrate that satisfies at least some of the aforementioned needs. More particularly, the present invented catalyst comprises a noble metal on a metal oxide support having support particle diameter of 1.5 mm or larger and the metal loadings allow conversion of 2-chloropropene of at least 0.06 kg/hr/kg of catalyst when reacted with methanol and carbon monoxide in the molar ratio of 2-chloropropene:methanol of 1:2 at a pressure of 4000 kPa and a temperature of 210° C.

The invention also provides a composition of matter comprising a substrate of a metal oxide of volume from about $3 \times 10^{-9}$ m$^3$ to about $2 \times 10^{-5}$ m$^3$ having a surface area from about 100 m$^2$/g to about 600 m$^2$/g, having dispersed on the surface thereof crystallites of a noble metal wherein the noble metal comprises from about 0.45 mmole/g to about 1.0 mmole/g based on total composition weight and the crystallites are sized so as to provide a dispersion of the noble metal of from about 50 percent to about 90 percent.

Dispersion is determined by the equation:

$$D = 100 \times (W/M);$$

wherein D equals the percent dispersion and W/M is the atomic ratio of chemisorbed hydrogen to the noble metal in the sample.

DETAILED DESCRIPTION OF THE INVENTION

The present invented catalyst preferably comprises shaped metal oxide substrates having particle volumes of at least $3.0 \times 10^{-9}$ m$^3$, metal loadings of at least 0.45 mmole/g and metal dispersions of at least 50 percent. Preferred are shaped metal oxide substrates of volume from $3.0 \times 10^{-9}$ m$^3$ to $2 \times 10^{-5}$ m$^3$ having metal loadings from 0.45 mmole/g to 1.0 mmole/g and metal dispersions of from 50 percent to 90 percent. Most preferred are such catalysts of volume from $1 \times 10^{-8}$ m$^3$ to $1 \times 10^{-5}$ m$^3$ having metal loadings from about 0.5 mmole/g to about 0.8 mmole/g and metal dispersions of from about 55 percent to about 85 percent. Usually such shaped substrates are in the form of extruded and chopped pellets of generally cylindrical form having a diameter of about 1.5–7 mm and a length of about 5–14 mm. Preferred are such cylindrical shaped substrates having a minimum diameter of about 1.5 mm. It has been found that metal oxide substrates of at least about 1.5 mm cross sectional size are extremely difficult to prepare in high metal loadings and dispersions according to prior art techniques.

By the term noble metals are included ruthenium, rhodium, palladium, osmium, iridium and platinum. Preferred noble metals are rhodium, palladium and platinum. A most preferred noble metal is palladium. Metal oxides suitable for supports according to the present invention are oxides and mixtures of oxides of metals of groups IIA, IIIB, IVB, IIIA and IVA of the Periodic Table. Examples include alumina (in crystalline forms known as α, γ or ρ), silica, aluminosilicates such as the well-known aluminosilicate zeolites, titania, magnesia, and mixtures thereof such as clays, etc. A preferred support is a metal oxide having hydroxyl groups covalently bonded to the surface thereof. Examples include alumina, silica and titania. A particularly preferred metal oxide is γ-alumina.

The process for preparing shaped metal oxide substrates is well-known. In one such process, the metal oxide powder, e.g., alumina, is compounded with a liquid, usually an acid such as concentrated nitric acid. The composition is formed into the desired shape and size by compressing, extruding, rolling, cutting or other means including combinations thereof. The green, shaped substrates are then generally dried and may be heated to calcination temperature for increased physical strength. Additional materials may be incorporated into the metal oxide for altered physical properties such as increased surface area, improved crush strength, etc. Examples of additives that may be added include binders, cements, other metal oxides, organic molecules to provide a template or clatherate effect, and metal or organic phosphites and phosphates. Suitable substrates may be prepared by the above-described process or commercially obtained.

Preferred are substrates having a surface area of 50–600 m$^2$/g, and crush strength of from about 1 lb/in$^2$ (703 kg/m$^2$) to about 1000 lb/in$^2$ ($7.03 \times 10^5$ kg/m$^2$).

In order to prepare catalysts according to the invention, the shaped substrate is coated with highly dispersed noble metal by contacting with an aqueous hydrochloric acid solution of a noble metal salt. Preferably, the metal salt employed is the noble metal chloride. The amount of metal salt employed is that amount chosen to provide the desired metal loading in the resulting supported metal catalyst. In this regard, it is desirable to prepare the catalyst by the technique of incipient wetness. Enough aqueous hydrochloric acid solution of the noble metal salt is prepared to thoroughly wet the volume of substrate employed, but not more than can be absorbed. By this process loss of valuable noble metal is minimized. The metal oxide substrate may be contacted with the noble metal solution according to known techniques such as spray impregnation wherein a volume of substrate particles in a mixer is thoroughly agitated while at the same time, the noble metal solution is sprayed onto the surface thereof in limited amounts so as to avoid over-wetting the substrates.

Enough hydrochloric acid is present in the acidified solution to provide a pH of between 1.0 and −1.0 and preferably between 0.8 and −0.75. The substrate is impregnated under conditions such that the metal species is contacted with at least about 50 percent of the substrate surface area and preferably with at least about 75 percent of the substrate surface area, thereby producing a minimum surface concentration of metal species. In this regard, it is presently believed without wishing to be bound thereby that the metal species present on the substrate surface is a complex of chloride ions and the noble metal. Generally, by contacting as much surface as possible with the available noble metal species, the lowest possible surface concentration thereof is obtained.

There has now been discovered a process suitable for impregnating the metal oxide support so that the above-described desirable result of dispersing the noble metal species evenly over as large a portion of the substrate surface as possible is now obtainable. Accordingly, it has now been found that if the substrate and solution are both heated to an elevated temperature prior to impregnation, maximum dispersion over the substrate surface can be obtained, resulting in a minimum surface density of metal species. Upon reduction, the resulting metal crystallite size is minimized due to the initial lowered surface density of metal species. Preferably, the substrate is heated to a temperature from about 75° C. to about 150° C., most preferably, from about 100° C. to about 120° C., and the solution is heated to a temperature from about 50° C. to about 95° C., most preferably to a temperature of from about 65° C. to about 95° C. at the time of contacting the substrate with the solution.

While the above technique is used to best advantage where an incipient wetness process is employed, it may be possible to obtain similar results if alternative techniques are used, e.g., by treating the substrate with the acidic metal solution or an organic solution of a similar metal species under conditions of time and temperature sufficient to allow relatively even metal coating throughout the substrate. The skilled artisan may easily test sample substrates to determine the degree of metal deposition on the substrate surface by observation of color change. In particular, a suitably impregnated substrate should evidence coloration due to the presence of metal evenly throughout the interior of the extrudate or substrate pellets. While the Applicants do not wish to be limited to any particular method of preparation, it has generally been observed that typical methods of catalyst preparation, such as precipitation from basic solution are not suitable to prepare catalysts of the present invention having high dispersions and metal loadings.

Once prepared so as to contain an even surface coating of metal species, the substrates are dried at elevated temperatures. Suitable drying temperatures are from about 100° C. to about 400° C., preferably from about 125° C. to about 300° C., and most preferably from 200° C. to 300° C. Lack of sufficient drying may result in crystallite growth during the subsequent activation procedure. It is preferred to perform the drying using slow drying techniques, in particular, it is preferred to perform the drying by increasing the temperature from ambient to the final drying temperature at a rate of less than or equal to 5° C. per minute, most preferably less than or equal to 0.5° C. per minute. The larger size catalyst particles generally require more care in the preparation, and thus the more preferred methods of preparation described herein may be necessary to achieve the desired loadings and dispersions. For most reactions, it is then necessary to generate the active catalytic species, most generally by reduction of the metal. Suitable processes for reduction are those well-known in the art including reduction with reducing agents such as hydrogen, carbon monoxide or a hydrogen-generating precursor such as hydrazine, formaldehyde, etc.

It has now been discovered that the method of reduction may significantly affect the catalytic properties of the supported metal catalyst. For example, a particularly effective carbonylation catalyst for use in the vapor phase reaction of 2-chloropropene, methanol and carbon monoxide to form methyl methacrylate is prepared by hydrogen reduction at a temperature from about 150° C. to about 350° C. of a highly dispersed palladium on alumina catalyst prepared according to the above-described incipient wetness technique at elevated temperatures. It is not presently known whether this particular method of reduction results in the preparation of a particular form of palladium crystallites or alternatively whether the catalyst comprises the corresponding metal hydride. The above phenomenon appears to be unrelated to crystallite growth inasmuch as no change in crystal size appears to be associated with the hydrogen reduction or activation process and conversely crystallites of comparable size prepared by carbon monoxide reduction have not proven nearly as effective in the carbonylation process.

SPECIFIC EMBODIMENTS

Having described the present invention, the following examples are provided as further illustrative of the present invention and are not be construed as limiting.

EXAMPLE 1

Palladium chloride (1.38 g) and concentrated hydrochloric acid (1.5 ml) are added to 20 ml of deionized water and the resulting solution pH of 0.08 is heated to 70° C. In a separate vessel, 15.7 g of extruded, cylindrical shaped γ-Al$_2$O$_3$ pellets (4 mm diameter, 7.5 mm length) are heated to 120° C. and held at that temperature for several hours. The extruded alumina is removed from the oven and immediately contacted while the alumina is at a temperature of at least about 110° C. with the hot metal solution. The impregnated metal catalyst is allowed to cool to room temperature then heated to 120° C. for two hours in a stream of air. The catalyst is activated by contacting with flowing hydrogen at an hourly space velocity (GHSV) of about 1000 at gradually increasing temperatures from room temperature to 250° C. over a one-hour period. Measurements of crystallite size by hydrogen chemisorption show the catalyst has a dispersion of 79 percent at a loading of 0.47 mmole Pd/g catalyst (5.0 percent Pd based on total catalyst weight).

EXAMPLE 2

The reaction procedure of Example 1 is substantially repeated employing 2.48 g of palladium chloride, 23 ml of deionized water, 2.0 ml of concentrated hydrochlorid acid, and 18.4 g of extruded γ-alumina shaped supports (pellets). The catalyst is activated in flowing hydrogen at a temperature of up to 500° C. Hydrogen chemisorption studies indicate the catalyst has a dispersion of 65 percent. The metal content of the catalyst is 0.70 mmole/g catalyst (7.5 percent Pd based on total catalyst weight).

EXAMPLE 3

Rhodium chloride trihydrate (RhCl$_3$3H$_2$O, 1.52 g) and concentrated hydrochloric acid (1.3 ml) are added to 13 ml of deionized water and the solution is heated to 70° C. In a separate vessel 10.2 g of γ-alumina is heated to 120° C. After removing the γ-alumina from the oven, it is immediately contacted while still at a temperature of at least about 110° C. with the hot aqueous solution of rhodium chloride according to the incipient wetness technique. The catalyst is dried at room temperature and then in a flowing air stream at 120° C. for about 2 hours. The catalyst is activated by hydrogen reduction at temperatures up to 250° C. (H$_2$ flow of 1000 GHSV). Measurements of crystallite size by hydrogen chemisorption show the catalyst has a metal dispersion of 70 percent and a metal loading of 0.53 mmole Rh/g catalyst (5.4 percent Rh based on total catalyst weight).

EXAMPLE 4

Silica Substrate

Dihydrogen hexachloroplatinate (5.97 g) and concentrated hydrochloric acid (5 ml) are added to 22 ml of deionized water and the solution is heated to 80° C. In a separate vessel, 19.2 g of α-alumina is heated to 120° C. After removing the α-alumina from oven, it is immediately contacted with the hot aqueous solution of chloroplatinic acid. The catalyst is dried at room temperature and then in an oven at 120° C. for 2 hours. The catalyst is activated in flowing hydrogen at temperatures up to 300° C. Measurements of crystallite size by hydrogen chemisorption show the catalyst has a dispersion of 67 percent and a metal loading of 0.51 mmole platinum/g of catalyst (10 percent platinum based on total catalyst weight).

EXAMPLE 5

Palladium chloride (2.52 g) and concentrated hydrochloric acid (6 ml) are added to 34 ml of deionized water and the solution is heated to 80° C. In a separate vessel, 28.7 g of γ-alumina (pellet volume 10$^{-7}$ m$^3$) is heated to 120° C. After removing the γ-alumina from the oven, the hot solution of aqueous palladium chloride is added. The catalyst is slowly dried overnight and then further dired by heating at a rate of 0.5° C./minute to 300° C. and held at 300° C. for 2 hours. The catalyst is cooled to room temperature and activated by treatment in flowing hydrogen at temperatures up to 250° C. Measurements of crystallite size by hydrogen chemisorption show the catalyst has a dispersion of 60 percent at a loading of 0.47 mmole palladium/g of catalyst (5 percent palladium based on total catalyst weight).

What is claimed is:

1. A composition of matter comprising a substrate of a metal oxide of volume from about $3 \times 10^{-9}$ m$^3$ to about $2 \times 10^{-5}$ m$^3$ having a surface area from about 50 m$^2$/g to about 600 m$^2$/g, having dispersed on the surface thereof crystallites of a noble metal selected from the group consisting of ruthenium, rhodium, palladium, osmium, iridium, platinum and mixtures thereof, wherein the noble metal comprises from about 0.45 mmole/g to about 1.0 mmole/g based on total composition weight and the crystallites are sized so as to provide a dispersion of the noble metal of from about 50 percent to about 90 percent when measured by hydrogen chemisorption using the formula $$D = 100 \times (W/M)$$

where (W/M)

is the atomic ratio of chemisorbed hydrogen to the noble metal.

2. A composition of matter according to claim 1 wherein the noble metal comprises palladium, rhodium or platinum.

3. A composition of matter according to claim 2 wherein the noble metal comprises palladium.

4. A composition of matter according to claim 1 wherein the substrate further comprises hydroxyl groups covalently bonded to the surface thereof.

5. A composition of matter according to claim 1 wherein the substrate comprises γ-alumina.

6. A composition of matter according to claim 4 wherein the substrate comprises silica.

7. A composition of matter according to claim 1 wherein the noble metal is present in an amount from about 0.50 mmole/g to about 0.80 mmole/g based on the total weight of the composition.

8. A composition of matter according to claim 1 wherein the palladium dispersion is from about 60 percent to about 85 percent.

9. A composition of matter according to claim 1 wherein the substrate is an γ-alumina extrudate of approximately cylindrical shape having a minimum cross-sectional diameter of at least about 1.5 mm.

10. A composition of matter according to claim 1 wherein the substrate volume is from about $1 \times 10^{-8}$ m$^3$ to about $1 \times 10^{-5}$ m$^3$ and the alumina has a crush strength from about 1 lb/in$^2$ (703 kg/m$^2$) to about 1000 lb/in$^2$ ($7.03 \times 10^5$ kg/m$^2$).

11. A composition of matter comprising a metal oxide substrate having a noble metal selected from the group consisting of ruthenium, rhodium, palladium, osmium, iridium, platinum and mixtures thereof, dispersed on the surface thereof wherein the composition of matter is prepared according to the incipient wetness technique by contacting at an elevated temperature a metal oxide substrate of volume from about $3 \times 10^9$ m$^3$ to about $2 \times 10^5$ m$^3$ having a surface area from about 50 m$^2$/g to about 600 m$^2$/g with a sufficient amount of aqueous hydrochloric acid solution of a noble metal salt having a pH from about 1.0 to about $-1.0$ so as to provide from about 0.45 mmole/g to about 1.0 mmole/g based on total composition weight and thereafter reducing the noble metal salt to prepare metal crystallites.

12. A composition according to claim 11 wherein the metal oxide substrate is preheated to a temperature from about 75° C. to about 150° C. and the aqueous hydrochloric acid solution of a noble metal salt is heated to a temperature from about 50° C. to about 95° C. at the time of contacting the metal oxide particles and the aqueous hydrochloric acid solution.

13. A composition of matter according to claim 11 wherein the noble metal comprises palladium.

14. A composition of matter according to claim 13 wherein the metal oxide comprises γ-alumina.

15. A composition of matter according to claim 11 wherein the pH of the aqueous hydrochloric acid solution is from about 0.8 to about $-0.75$.

16. A composition of matter according to claim 11 wherein the metal crystallites are formed by reduction with hydrogen gas.

17. A process for preparing by the incipient wetness technique a catalyst comprising a metal oxide support having ruthenium, rhodium, palladium, osmium, iridium, platinum or mixtures thereof, metal crystallites dispersed on the surface thereof comprising (1) heating the metal oxide support to a temperature of from about 75° C. to about 150° C.; (2) heating to a temperature from about 50° C. to about 95° C. a sufficient amount to provide from about 0.45 mmole/g to about 1.0 mmole/g of noble metal based on final composition weight of a hydrochloric acid solution of a noble metal having a pH from about 1.0 to about −1.0; (3) contacting the heated substrate and heated noble metal salt solution; (4) drying the resulting metal oxide containing a noble metal salt; and (5) reducing the noble metal salt to form noble metal crystallites.

18. A process according to claim 17 wherein prior to contacting of the substrate and noble metal salt solution, the substrate is heated to a temperature of from about 100° C. to about 120° C.

19. A process according to claim 17 wherein the noble metal is palladium, rhodium or platinum.

20. A process according to claim 17 wherein the noble metal is palladium.

21. A process according to claim 17 wherein the substrate is γ-alumina.

* * * * *